(12) United States Patent
White et al.

(10) Patent No.: US 6,658,534 B1
(45) Date of Patent: Dec. 2, 2003

(54) MECHANISM TO REDUCE INSTRUCTION CACHE MISS PENALTIES AND METHODS THEREFOR

(75) Inventors: Steven Wayne White, Austin, TX (US); Hung Qui Le, Austin, TX (US); Kurt Alan Feiste, Austin, TX (US); Paul Joseph Jordan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/052,247

(22) Filed: Mar. 31, 1998

(51) Int. Cl.[7] .............................................. G06F 12/00
(52) U.S. Cl. ...................... 711/137; 711/125; 712/207; 712/237
(58) Field of Search ................................. 711/125, 169, 711/213, 137; 712/207, 237

(56) References Cited

U.S. PATENT DOCUMENTS 5,813,045 A * 9/1998 Mahalingaiah et al. ..... 711/204
5,845,101 A * 12/1998 Johnson et al. ............. 712/207
5,918,045 A * 6/1999 Nishii et al. ................ 711/213

* cited by examiner

Primary Examiner—Matthew Kim
Assistant Examiner—M. D. Anderson
(74) Attorney, Agent, or Firm—Barry S. Newberger; Winstead Sechrest & Minick P.C.; Robert M. Carwell

(57) ABSTRACT

The mechanism to reduce instruction cache miss penalties by initiating an early cache line prefetch is implemented. The mechanism provides for an early prefetch of a next succeeding cache line before an instruction cache miss is detected during a fetch which causes an instruction cache miss. The prefetch is initiated when it is guaranteed that instructions in the subsequent cache line will be referenced. This occurs when the current instruction is either a non-branch instruction, so instructions will execute sequentially, or if the current instruction is a branch instruction, but the branch forward is sufficiently short. If the current instruction is a branch, but the branch forward is to the next sequential cache line, a prefetch of the next sequential cache line may be performed. In this way, cache miss latencies may be reduced without generating cache pollution due to the prefetch of cache lines which are subsequently unreferenced.

33 Claims, 6 Drawing Sheets

MECHANISM TO REDUCE INSTRUCTION CACHE MISS PENALTIES AND METHODS THEREFOR

TECHNICAL FIELD

The present invention relates in general to a data processing system, and in particular, to instruction prefetch in a data processing system.

BACKGROUND INFORMATION

As computers have been developed to perform a greater number of instructions at greater speeds, many types of architectures have been developed to optimize this process. For example, a reduced instruction set computer (RISC) device utilizes simpler instructions and greater parallelism in executing those instructions to ensure that computational results will be available more quickly than the results provided by more traditional data processing systems. In addition to providing increasingly parallel execution of instructions, some data processing systems employ memory devices within the processor to permit retrieval of instructions from a system memory before they are required for execution by the processor. A set of instructions is loaded from a system memory device into this processor memory, the so-called cache or level 1 (L1) cache for subsequent dispatching to execution units within the processor. The set of instructions loaded from memory includes a sufficient number of instructions to fill a block of cache memory of predetermined size, a "cache line."

Fetching units first look to the cache for the next instruction it needs. If the instruction is not in the cache, a "cache miss," the fetching unit must retrieve the instruction from the system memory. As processor clock rates increase more rapidly than memory access times do, the latency penalties from a cache miss increase accordingly.

Memory latency due to a cache miss may be reduced by prefetching an instruction cache line from a system memory device. However, if an instruction that alters an instruction sequence path is executed, the prefetched cache line may not be used. That is, an instruction, such as a branch, may cause a jump to an instruction path that is outside the prefetched cache line. Prefetching a cache line that later is unused leads to "cache pollution" that reduces the effectiveness of the prefetching.

To reduce instruction cache pollution due to prefetching, restrictions have been placed on the fetch process. One restriction used in many implementations is to delay fetching a cache line until a fetch request is made which causes an instruction cache miss. In other words, a miss request for the subsequent cache line from a system memory device will not be initiated until an instruction queue which receives instructions from the instruction cache has sufficient room to hold the remaining instructions in the current instruction cache line. Other implementations do not allow a miss request to be sent to a bus controller to retrieve the next cache line from a system memory device until it is known that there are no outstanding instructions in the current cache line that will change the instruction path. In either case, the efficacy of prefetch mechanisms in reducing the latency penalty from a cache miss is reduced by the restrictions placed thereon.

Restrictions placed on instruction prefetching delay the prefetch and thereby reduce the effectiveness of prefetching in reducing cache miss penalties. Therefore, there is a need in the art for a prefetch mechanism that permits cache miss requests to be issued earlier without increasing cache pollution.

SUMMARY OF THE INVENTION

The previously mentioned needs are addressed by the present invention. Accordingly, there is provided in a first form, a method of reducing cache miss penalties. The method includes determining if a current instruction changes an instruction execution path. Then, in a next step, if the instruction does not change the instruction path outside of a next sequential cache line, a next sequential cache line is prefetched if no remaining instruction in a current cache line changes an instruction execution path outside of the next cache line.

Additionally, there is provided, in a second form, an apparatus for reducing instruction cache miss penalties. The apparatus includes an instruction storage device for receiving a plurality of instructions from at least one memory device. A predecode device predecodes a portion of each instruction, and outputs a predecode bit associated with each instruction to the instruction storage device. The apparatus also includes circuitry for generating a prefetch data value from one or more of the predecode bits. A fetch logic device fetches instructions from a memory device for loading into the instruction storage device. The fetch logic device prefetches a next sequential instruction set in response to a predetermined value of the prefetch data value.

Finally, there is provided, in a third form, a data processing system that includes at least one memory device and an instruction storage device for receiving a plurality of instructions from the one or more memory device. A predecode device predecodes a portion of each of the instructions, and outputs a predecode bit associated with each instruction to the instruction storage device. A fetch logic device for fetching instructions from the one or more memory devices, prefetches a next sequential instruction set for loading into the instruction storage device in response to the predecode bits.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
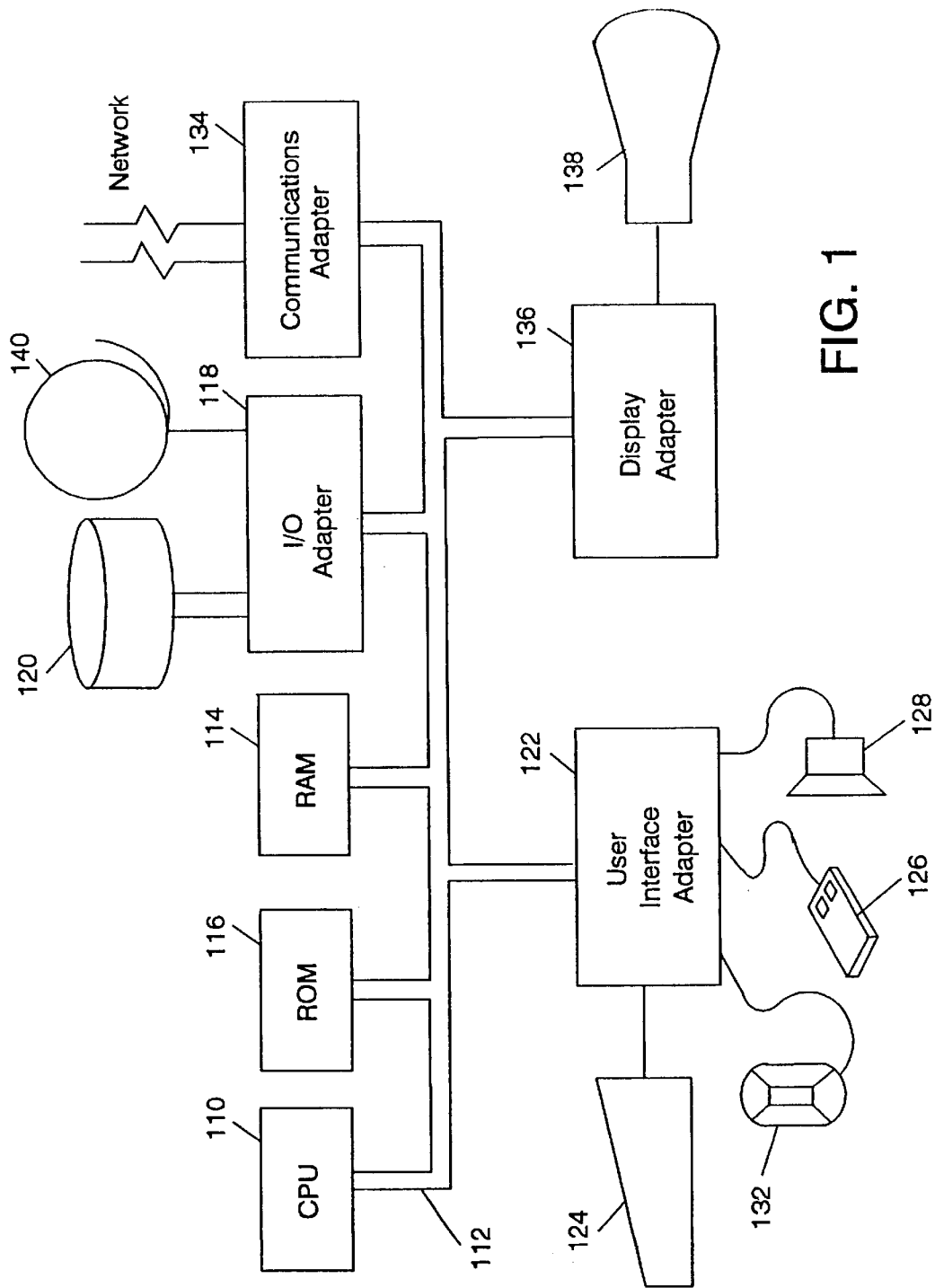
FIG. 1 illustrates, in block diagram form, a data processing system in accordance with one embodiment of the present invention.

The present invention provides an instruction cache miss penalty reduction mechanism that permits early cache line prefetch without generating cache pollution by prefetching cache lines that will not be used. Cache line prefetch is mediated using a predecode bit, on an instruction-by-instruction basis, to maintain branch tag information in order to accelerate the initiation of instruction cache miss requests. The branch tag information is constructed so that it is "guaranteed" that instructions in the next sequential cache line will be referenced. Then, if the instruction cache directory indicates that the next sequential line is not present, the next sequential line may be prefetched immediately. The prefetch need not wait until a cache miss is detected. If it cannot be guaranteed that instructions in this subsequent cache line will be referenced, no early prefetch of the subsequent line is made and prefetch of a cache line initiates when a fetch is made which causes a cache miss.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Furthermore, during a description of the implementation of the invention, the terms "assert" and "negate" and various grammatical forms thereof, are used to avoid confusion when dealing with the mixture of "active high" and "active low" logic signals. "Assert" is used to refer to the rendering of a logic signal or register bit into its active, or logically true, state. "Negate" is used to refer to the rendering of a logic signal or register bit into its inactive, or logically false, state. Additionally, a binary value may be indicated by an "%" symbol proceeding a value and a hexadecimal value may be indicated by an "$" symbol proceeding a value.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, such as a PowerPC microprocessor ("PowerPC" is a trademark of IBM Corporation) according to "The PowerPC Architecture: A Specification for a New Family of RISC Processors", 2d edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The cache miss penalty reduction mechanism of the present invention is included in CPU 110. The CPU 110 is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communication with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138. Additionally, an operating system such as AIX ("AIX" is a trademark of the IBM Corporation) is used to coordinate the functions of the various components shown in FIG. 1.

Figure 2:
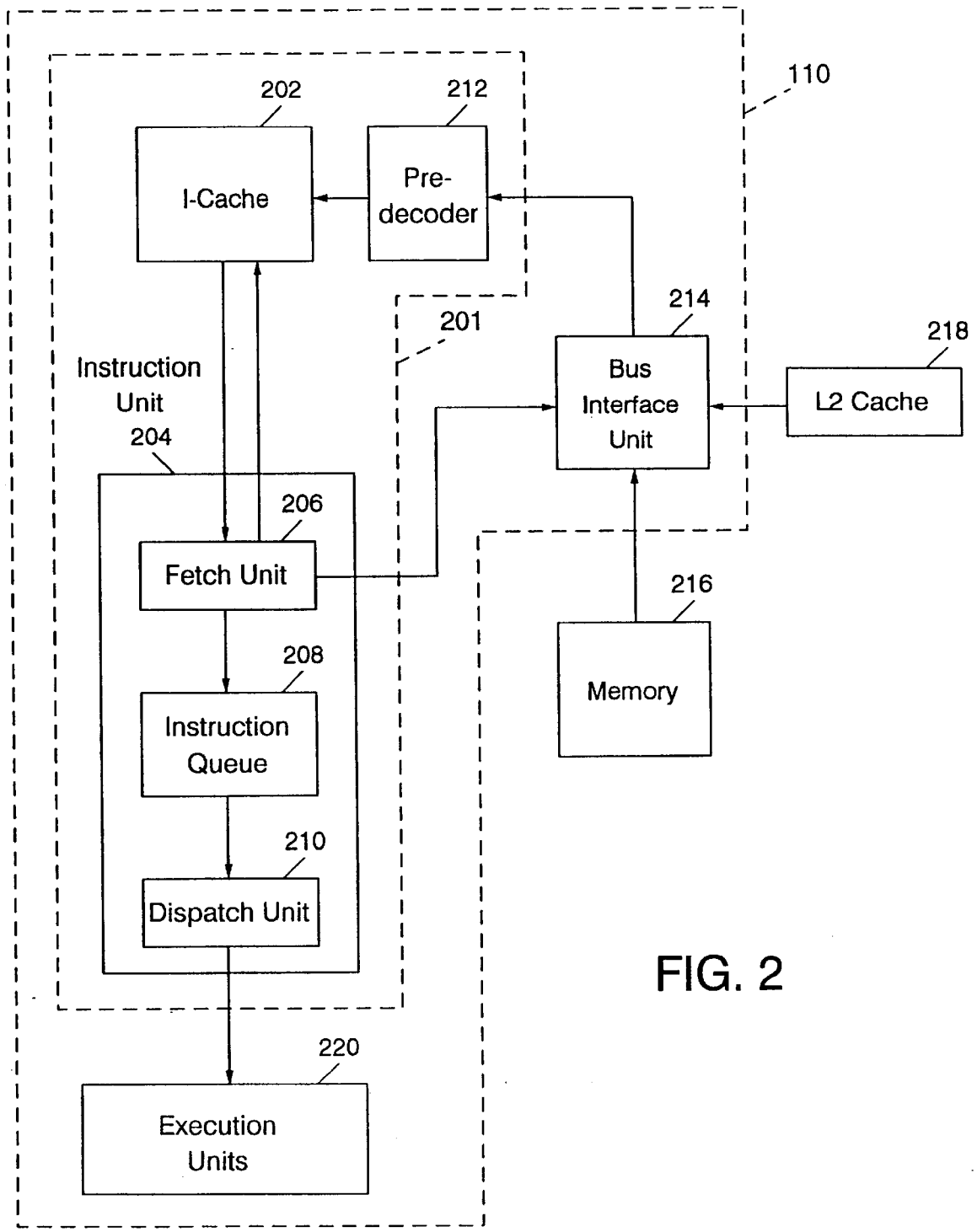
FIG. 2 illustrates, in block diagram form, a cache miss penalty reduction mechanism in accordance with one embodiment of the present invention.

CPU 110 incorporating cache miss penalty reduction mechanism 201 according to the principles of the present invention is illustrated in greater detail in FIG. 2. Cache miss penalty reduction mechanism 201 includes an instruction cache (I-cache) 202, instruction unit 204 which includes fetcher 206, instruction queue 208, and dispatch unit 210, and predecoder 212. Bus Interface Unit (BIU) 214 within CPU 110 interfaces CPU 110 with external memory which may include system memory 216 and level-2 (L2) cache 218. I-cache 202 stores a plurality of instructions for execution by execution units 220. Instructions are retrieved from I-cache 202 by fetch unit 206 and sent therefrom to instruction queue 208. Instructions are queued sequentially in instruction queue 208 from which they are passed to dispatch unit 210 and sent to execution units 220 for execution. Fetch unit 206 operates to maintain a filled instruction queue 208. That is, as instructions are pulled from a bottom of instruction queue 208, by dispatch unit 210, fetch unit 206 fetches the next instruction in sequence from I-cache 202. If the instruction at a top of instruction queue 208 is the last instruction in a cache line of I-cache 202, the next instruction to be fetched by fetch unit 206 may not be in I-cache 202. Then, a cache miss has occurred, and the next plurality of instructions to be loaded by I-cache 202 must be retrieved from external memory, such as system memory 216 or L2 cache 218. A cache miss request is issued to BIU 214 which then retrieves the next plurality of instructions, that is, the next cache line, from either memory 216, or L2 cache 218, depending on the location in external memory of the next cache line in sequence.

Figure 3:
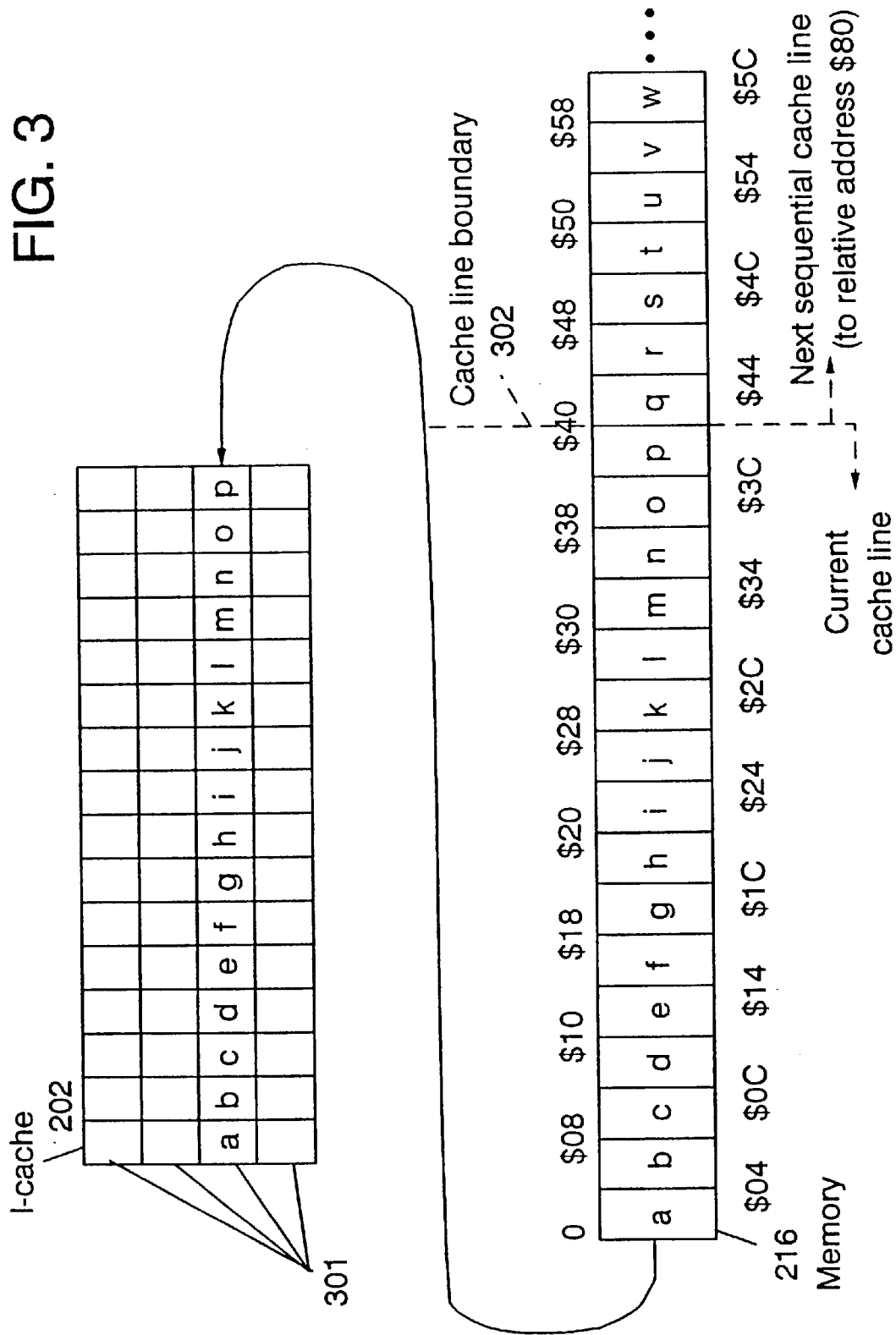
FIG. 3 schematically illustrates an instruction cache line memory mapping.

The relationship between a cache line in I-cache 202 and its preimage in a system memory device, such as system memory 216 or L2 cache 218 is illustrated in FIG. 3. I-cache 202 is shown as being four cache lines 301 deep, with each cache line 301 containing sixteen instructions. It would be understood that other embodiments may implement I-cache 202 having other predetermined values for the cache depth and number of instructions per cache line. The preimage of the current cache line 301 included instructions "a"–"p" residing at relative addresses $00–$3F. At prefetch, instructions "a"–"p" are loaded into I-cache 202.

Instruction "p" lies on cache line boundary 302 of the current cache line 301. After instruction "p" is retrieved from I-cache 202 by fetch unit 200 in FIG. 2 and sent to instruction queue 208, the next fetch, for instruction "q" will result in a cache miss, because instruction "q" is not in I-cache 202.

The operation of cache miss penalty mechanism 201 will now be described in detail. In the event of a cache miss, CPU 110 must wait for the retrieval of the next cache line for memory. To the extent that the speed of CPU 110 significantly exceeds memory access times, this memory latency gives rise to a cache miss penalty, which may reduce overall processor performance.

If a cache line can be retrieved before it is needed, the cache miss penalty may be reduced. However, if the next sequential cache line is retrieved but then not used, the advantage in prefetching the cache line may be lost due to the unused cache line which occupies space in the cache and which may displace other instructions, resulting in additional misses later.

Instructions that cause a change in instruction path may be a source of cache pollution. Instructions typically execute in sequence. However, if an intermediate instruction causes a jump to an instruction located in a discontiguous portion of memory, which may be memory 216 or L2 cache 218, then a prefetch to the next succeeding cache line will have been fruitless. These instructions may include branch instructions, and other instruction-path-changing instructions, such as the system linkage instructions, system call (sc) and return from interrupt (rfi).

Nevertheless, not all branch instructions necessarily lead to cache pollution. A branch that causes a jump to an instruction that is within the current cache line or the next subsequent cache line does not give rise to cache pollution if the next subsequent cache line is prefetched. In all such cases, the next subsequent cache line will be referenced independent of the branch instruction.

Therefore, for the purposes of prefetch according to the principles of the present invention, instructions may be assigned to one of three categories. The first category of instructions are non-branch instructions. With respect to these, as discussed hereinabove, instructions execute sequentially, and prefetching the next subsequent cache line will not give rise to cache pollution. The second category of instructions are "short" forward branch instructions. All other branch instructions are in the third category. Short forward branch instructions are those that branch forward, that is, to a later instruction, but which do not branch to a location that exceeds the next sequential cache line boundary. Although short forward branch instructions alter instruction paths, for the reason discussed hereinabove, they do not give rise to cache pollution when the next sequential cache line is prefetched. With respect to the third category of instructions, prefetching the next sequential cache line when an instruction in this category is in instruction queue 208, or will be fetched later in the current line, may lead to cache pollution.

Assigning a particular instruction to one of three categories may be implemented by performing a partial decode of the instruction. Referring again to FIG. 2, predecoder 212 partially decodes each instruction before it is sent to I-cache 202. Predecoder 212 determines whether an instruction is a branch instruction, and if the instruction is a branch instruction, if it branches forward within the same cache line, or into the next sequential cache line. Predecoder 212 may make this determination by decoding the displacement field in the instruction. The displacement field contains a data value that provides an offset from the current instruction address, and adding the displacement to the current instruction address creates the target address of the forward branch. If the target address does not exceed the next sequential cache line boundary, then the instruction being partially decoded by predecoder 212 is a short forward branch. Conversely, if the target address of the branch exceeds the next sequential cache line boundary, then the branch instruction is in the third category, as previously described.

To simplify hardware, nonrelative branches, such as absolute branches, and register branches and sc and rfi instructions can conservatively be considered in the third category regardless of actual branch target location.

Predecoder 212 supplies a predecode bit that tags each instruction. A predecode bit is asserted for a particular instruction if that instruction is a non-branch instruction, or a short forward branch instruction. That is, if a particular instruction is either in the first or second category of instructions the predecode bit is asserted. The predecode bit is sent, along with the instruction, from predecoder 212 to I-cache 202. Fetch unit 206 may then use the predecode bit associated with each of the instructions in I-cache 202 to prefetch cache lines. This will be further discussed in conjunction with FIG. 4A and FIG. 4B which illustrate, in further detail, embodiments of cache miss penalty reduction mechanism 201 in accordance with the principles of the present invention.

Figure 4A:
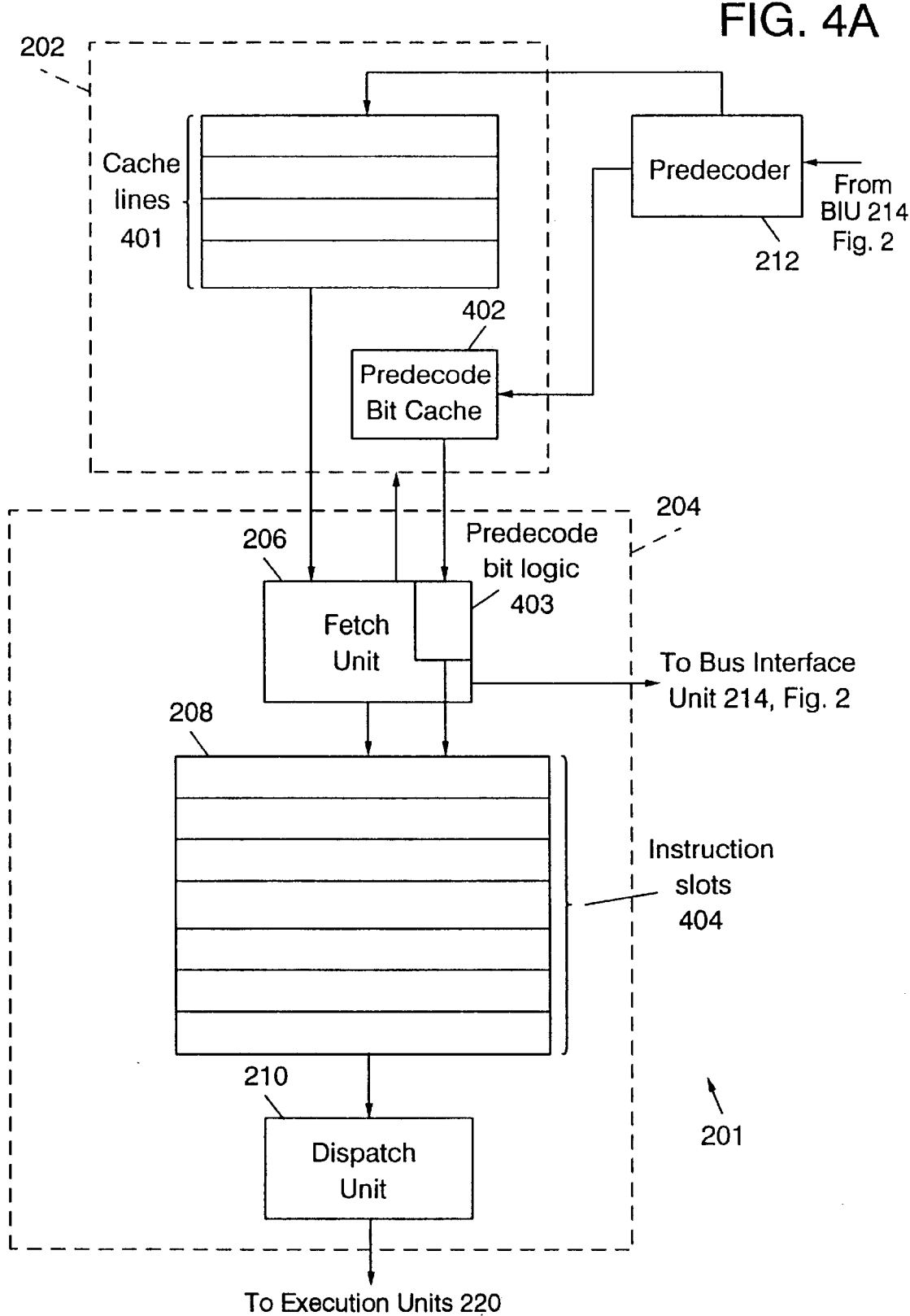
FIG. 4A illustrates, in block diagram form, a cache miss penalty reduction mechanism in accordance with an alternative embodiment of the present invention.

Refer now to FIG. 4A in which a cache miss penalty reduction mechanism 201 according to an embodiment of the present invention is shown. I-cache 202 includes a plurality of cache lines 401, and a predecode bit cache 402. Predecode cache 402 receives the predecode bit from predecoder 212 associated with each of the instructions included in one of cache lines 401. As each instruction is fetched from I-cache 202 by fetch unit 206, its corresponding predecode bit is sent to predecode bit logic 403 in fetch unit 206. An instruction retrieved from I-cache 202 by fetch unit 206 is stored in one of instruction slots 404 in instruction queue 208. Predecode bit logic 403 "ANDs" the predecode bit of the current instruction being fetched from I-cache 202 with each of the predecode bits of the instructions remaining in the cache line 401 containing the current instruction. The result of this logical operation is a summary bit outputted by predecode bit logic 403 and sent along with the current instruction to instruction queue 208.

The summary bit provides a tag that can be used to initiate a prefetch before a cache miss is detected. If, during any cycle, a given instruction in the instruction queue has its associated summary bit set, and there are no prior unresolved branches, then, if the subsequent cache line is not already in I-cache 202, that line then could be prefetched immediately. In this case, the prefetch of the next sequential cache line will not give rise to cache pollution because it is guaranteed that instructions in the next sequential cache line will be referenced.

The cache miss penalty may also be reduced significantly in this way. If, for example, the summary bit is set for the first instruction in a cache line then, in an embodiment of the present invention having a sixteen instruction cache line, the cache miss might initiate approximately fifteen cycles earlier than it otherwise would have, assuming typical cycles per instruction rates of approximately one.

Figure 4B:
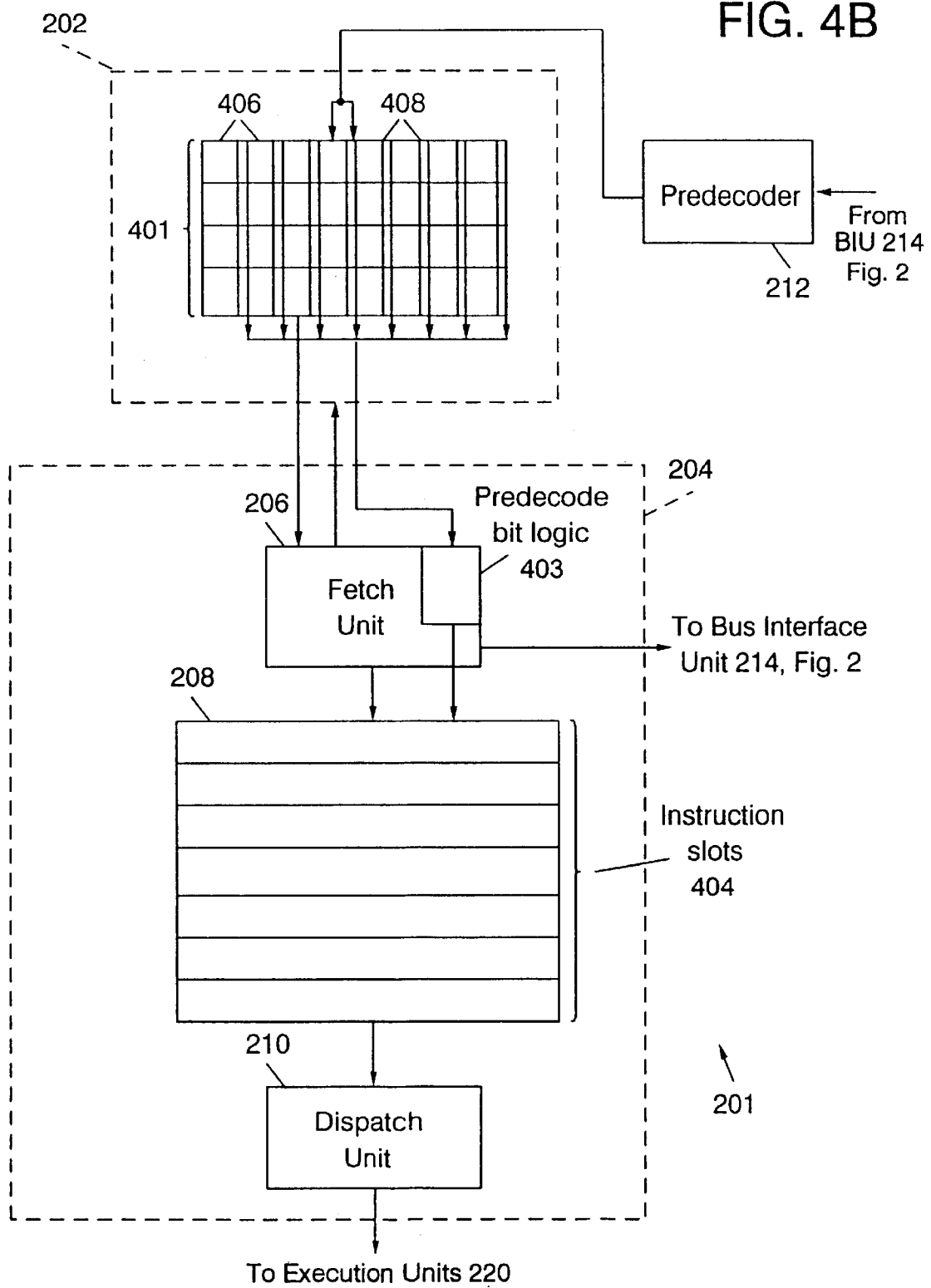
FIG. 4B illustrates, in block diagram form, a cache miss penalty reduction mechanism in accordance with another alternative embodiment of the present invention.

Refer now to FIG. 4B, showing an alternative embodiment of a cache miss penalty reduction mechanism 201 according to the principles of the present invention. In such an embodiment, each instruction field 406 within cache lines 401 may include a subfield 408 to contain the predecode bit, received from predecoder 212, associated with its corresponding instruction. The plurality of subfields 408 store the predecode bits for the instructions in I-cache 202 in the same way that predecode cache 202, implemented as a separate structure from the cache lines 401 in the embodiment of FIG. 4A, stored predecode bits. Predecode bit logic 403 receives predecode bits from the plurality of subfields 408 associated with a current cache line and generates the summary bit therefrom in exactly the same way as previously discussed in conjunction with FIG. 4A.

Figure 5:
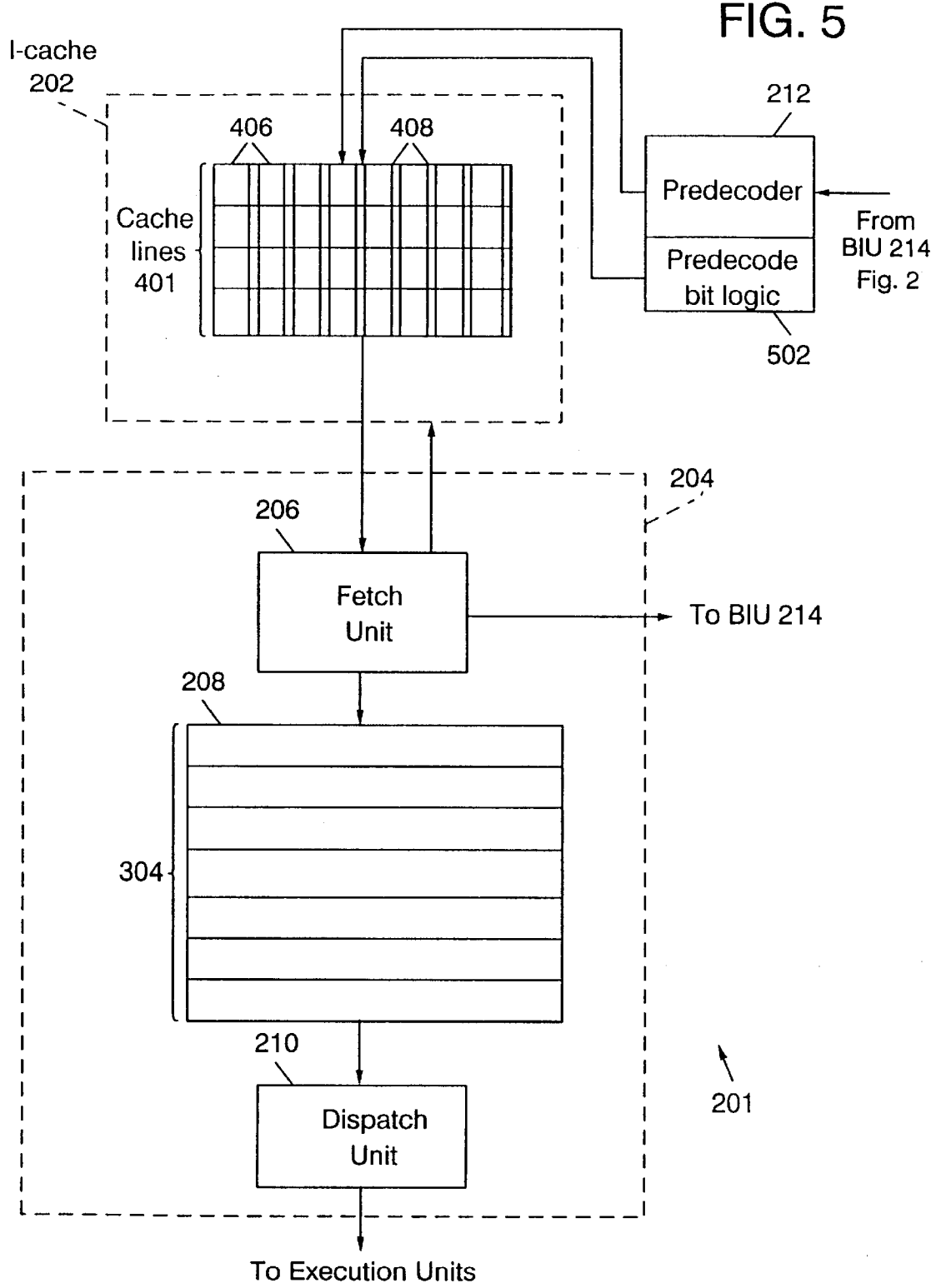
FIG. 5 illustrates, in block diagram form, a cache miss penalty reduction mechanism in accordance with yet another alternative embodiment of the present invention.

Refer now to FIG. 5 in which is illustrated yet another alternative embodiment of a cache miss penalty reduction mechanism 201 according to the principles of the present invention. Predecoder 212 includes predecode bit logic 502 which calculates a summary bit for each instruction in a cache line currently retrieved from memory, such as memory 216 of FIG. 2. The summary bit calculated by predecode bit logic 502 associated with each instruction in the cache line is calculated in exactly the same way as the summary bit calculated by predecode bit logic 403 in FIG. 4A. The summary bit for each instruction is calculated by predecode bit logic 502 by forming the logical "AND" of the predecode bit associated with that instruction and the predecode bit associated with each subsequent instruction in current cache line 401. In the embodiment of the present invention illustrated in FIG. 5, the summary bit is then stored in the subfield 408 in the cache line field 406 containing the corresponding instruction. When an instruction is retrieved from I-cache 202 by fetch unit 206 and sent to instruction queue 208, the summary bit is also retrieved from the corresponding subfield 408 and stored along with the instruction in instruction queue 208. Just as the embodiment of the present invention illustrated in FIGS. 4A and 4B, when, during any instruction cycle, a given instruction in instruction queue 208 has its summary bit set, and there are no prior unresolved branches, the subsequent cache line would immediately be prefetched if not already in I-cache 202.

Although the embodiment of a cache miss penalty reduction mechanism according to the principles of the present invention as illustrated in FIG. 5 stores each instruction summary bit in a subfield 408 in an associated instruction field 406 in each of cache lines 401, it would be understood that the summary bits may alternatively be stored in a separate structure within I-cache 202. That is, I-cache 202 may, alternatively, store each summary bit in a summary bit cache (not shown) analogous to predecode cache 402 in FIG. 4A.

In yet another alternative embodiment of cache miss penalty reduction mechanism 201 according to the principles of the present invention, the predecode bit logic may be simplified if the short branch instruction category is modified. If the category of short branch instructions is defined to include branch instructions with a displacement to less than a cache line, then a short branch can be tested by forming the logical "OR" of higher order bits from the branch instruction's displacement field. For example, in an embodiment in which a branch cache line is 16 ($10) instructions long, and each instruction is 4 bytes, then the relative address of a cache line boundary is $40 as shown in FIG. 3. Then, predecode logic, such as predecode logic 502 in FIG. 5, would OR bits 4–15 in a 16-bit displacement field, in an architecture in which instructions are aligned on 4-byte boundaries. In such an architecture, the two most significant bits of the displacement field are implied. Thus, if one or more of displacement field bits 4–15 are asserted, the instruction may branch beyond the cache line boundary of the next sequential cache line, depending on the current instruction's location in the current cache line 401. Then, the bit representing logical "OR" of these bits would be asserted. The predecode bit for the instruction would then be calculated by taking the complement of this value and forming its logical "AND" with a "non-branch" bit that is asserted by predecoder 212 when an instruction is a non-branch instruction. As a result of this calculation, the predecode bit is asserted if an instruction is a non-branch instruction or a short branch instruction. Conversely, this calculation negates the predecode bit if an instruction is a backward branch, or branch beyond the next sequential cache line, including the non-branch path altering instructions described hereinabove.

The predecode bits thus calculated are used to initiate a cache line prefetch as previously discussed in conjunction with FIGS. 4A, 4B and 5 hereinabove. In an embodiment of a cache miss penalty reduction mechanism 201 in which the predecode bits are sent to I-cache 202, such as that shown in FIGS. 4A and 4B, the predecode bits are retrieved when an instruction is fetched from I-cache 202 by fetch unit 206. Predecode bit logic 403 receives the predecode bits and generates a summary bit which is sent to instruction queue 208 along with the instruction, as previously described in conjunction with FIG. 4. Alternatively, predecode bit logic 502 may generate the summary bit from the predecode bits generated in predecoder 212 and send the summary bits corresponding to each instruction to I-cache 202 along with the instructions, as previously described in conjunction with FIG. 5.

In yet another embodiment of an instruction cache miss penalty reduction mechanism according to the principles of the present invention, the predecode bit logic may generate a summary bit on an instruction group basis. In such an embodiment, the predecode bit logic generates the summary bit for a particular instruction by logically combining the predecode bit associated with that instruction with the predecode bits from a predetermined number, N, adjacent instructions. Thus, for example, in an embodiment having sixteen instructions per cache line, a cache miss penalty reduction mechanism of the present invention might generate summary bits associated with four groups of four instructions each. In such an embodiment, the fetch logic would need to consider only four summary bits for the current line. The fetch logic could initiate a cache miss request for the subsequent line if there are no unresolved branches prior to the given instruction in the instruction queue, and the summary bit is set for this instruction group, and the subsequent groups to the end of the current instruction cache line.

Although the cache miss penalty reduction mechanism according the principles of the present invention have been described in an embodiment in which instructions are either in the category of non-branch instructions, or short branch instructions, assert a predecode bit, an alternative embodiment which complementary logic is used may also be implemented. In such an embodiment, a branch bit is negated if the current instruction is a non-branch instruction, and the predecode bit is negated if a branch instruction is a short branch.

In an embodiment in which a short branch instruction is defined as a branch instruction with a displacement to less than a cache line, as discussed hereinabove, the predecode bit is calculated by forming the logical OR of high order displacement bits, as previously discussed, with the branch bit. In other words, the associative property of set theoretic union operations assures that the "ORing" of the higher order displacement bits with the branch bit is equivalent to first "ORing" the higher order displacement bits to form the resulting logical OR value, and then "ORing" that bit with the branch bit. It would be understood that both form alternative embodiments embraced by the principles of the present invention. Summary bits are then formed by "ORing" the predecode bit of the current instruction with the predecode bits of subsequent instructions in the same cache line.

In an alternative embodiment of cache miss penalty reduction mechanism 201 in which summary bits are associated with a group of instructions, the summary bit is calculated by "ORing" the predecode bit of the current instruction with the predecode bits of all instructions in the same, predetermined, group.

Although the present invention and its advantages have been described in detail, it should be understood that various changes, substitutions and alterations can be made herein without departing from the spirit and scope of the invention as defined by the appended claims.

What is claimed is:

1. In a data processor, a method of reducing cache miss penalties comprising the steps of:
   determining if a fetched instruction is an instruction-path-changing instruction; and
   if said fetched instruction is not an instruction-path-changing instruction, prefetching a next sequential preselected instruction set if no remaining instructions in a current cache line are not path-changing instructions, wherein an instruction-path-changing instruction branches beyond said next sequential preselected instruction set.

2. The method of claim 1 wherein said step of prefetching said next sequential preselected instruction set further comprises the steps of:
   associating a predecode bit with said fetched instruction, wherein said predecode bit is set to a preselected value in response to said step of determining if said instruction is said instruction-path-changing instruction; and
   prefetching said next sequential preselected instruction set in response to said preselected value.

3. The method of claim 2, wherein said step of prefetching said next sequential preselected instruction set further comprises the steps of:
   calculating a data value in response to a set of said predecode bits; and
   prefetching said next sequential preselected instruction set in response to a predetermined value of said data value.

4. The method of claim 3, wherein said set of predecode bits includes a predecode bit associated with said fetched instruction and a predecode bit associated with each subsequent instruction in a current preselected instruction set.

5. In a data processor, the method of reducing cache miss penalties comprising the steps of:
   determining if a fetched instruction is an instruction-path-changing instruction; and
   if said fetched instruction is not an instruction-path-changing instruction, prefetching a next sequential preselected instruction set if no remaining instructions in a current cache line are not path-changing instructions, wherein an instruction-path-changing instructions branches beyond said next sequential preselected instruction set, wherein said step of prefetching said next sequential preselected instruction set further comprises the steps of:
      associating a predecode bit with said fetched instruction, wherein said predecode bit is set to a preselected value in response to said step of determining if said instruction is an instruction-path-changing instruction; and
      prefetching said next sequential preselected instruction set in response to said preselected value, wherein said step of prefetching said next sequential preselected instruction set further comprises the steps of:
         calculating a data value in response to a set of said predecode bits; and
         prefetching said next sequential preselected instruction set in response to a predetermined value of said data value, wherein said step of calculating said data value comprises the step of forming a logical AND of said predecode bits.

6. In a data processor, the method of reducing cache miss penalties comprising the steps of:
   determining if a fetched instruction is an instruction-path-changing instruction; and
   if said fetched instruction is not an instruction-path-changing instruction, prefetching a next sequential preselected instruction set if no remaining instructions in a current cache line are not path-changing instructions, wherein an instruction-path-changing instructions branches beyond said next sequential preselected instruction set, wherein said step of prefetching said next sequential preselected instruction set further comprises the steps of:
      associating a predecode bit with said fetched instruction, wherein said predecode bit is set to a preselected value in response to said step of determining if said instruction is an instruction-path-changing instruction; and
      prefetching said next sequential preselected instruction set in response to said preselected value, wherein said step of prefetching said next sequential preselected instruction set further comprises the steps of:
         calculating a data value in response to a set of said predecode bits; and
         prefetching said next sequential preselected instruction set in response to a predetermined value of said data value, wherein said step of calculating said data value comprises the step of forming a logical OR of said predecode bits.

7. The method of claim 3, wherein said set of predecode bits includes a predecode bit associated with said current instruction and a predecode bit associated with a predetermined set of subsequent instructions in a current preselected instruction set, said step of calculating a data value further comprising the step of calculating a plurality of data values, each associated with a plurality of predetermined sets of subsequent instructions.

8. The method of claim 1, wherein said step of determining if said fetched instruction is said instruction-path-changing-instruction further comprises the step of determining if said fetched instruction is a branch instruction.

9. The method of claim 1, wherein said step of determining if said fetched instruction is said instruction-path-changing instruction further comprises the step of, if said instruction is a branch instruction, determining if a branch address of said branch instruction is beyond said next sequential preselected instruction set.

10. The method of claim 9, wherein said step of determining if said branch address is beyond said next sequential preselected instruction set further comprises the step of adding a portion of a data value in a displacement field of said fetched instruction to a portion of a current instruction address.

11. The method of claim 9, wherein said step of determining if said branch address is outside said next sequential preselected instruction set further comprises the step of forming a logical combination of a predetermined set of bits in a displacement field of said prefetched instruction.

12. The method of claim 1, wherein the fetched instruction is retrieved from memory external to the data processor into an instruction cache in the data processor.

13. The method of claim 12, wherein the next sequential preselected instruction set is prefetched from the external memory to the instruction cache.

14. An apparatus for reducing cache miss penalties comprising:
    an instruction storage device for receiving a plurality of instructions from at least one memory device;

a predecode device for predecoding a portion of each of said plurality of instructions, said predecode device outputting a predecode bit associated with each instruction to said instruction storage device, wherein said predecode device outputs a predecode bit having a first predetermined value if said associated instruction is an instruction-path-changing instruction, and a second predetermined data value otherwise;

circuitry for generating a prefetch data value from one or more of said predecode bits; and a fetch logic device for fetching instructions from a memory device for loading into said instruction storage device, said fetch logic device prefetching a next sequential instruction set into said instruction storage device in response to a predetermined value of said prefetch data value.

15. The apparatus of claim 14 wherein said instruction storage device is an instruction cache.

16. The apparatus of claim 14, wherein said instruction storage device includes a plurality of instruction storage fields, and a predecode bit storage device.

17. The apparatus of claim 14, wherein said instruction storage device includes a plurality of instruction storage fields, each of said plurality of instruction storage fields including a subfield for receiving an associated predecode bit.

18. The apparatus of claim 14, wherein said fetch logic further includes predecode bit logic, said predecode bit logic comprising said circuitry for generating said prefetch data value.

19. The apparatus of claim 18, wherein said prefetch data value is generated in response to said fetch logic retrieving an instruction from said instruction storage device, and associated therewith.

20. The apparatus of claim 19, wherein said prefetch data value is sent to an instruction queue along with said instruction.

21. The apparatus of claim 19, wherein said instruction queue includes a plurality of storage locations each for storing an instruction and associated prefetch data value, and wherein said fetch logic loads a next sequential instruction set into said instruction storage device in response to one of said associated prefetch data values.

22. The apparatus of claim 14, wherein said predecoder further includes predecode bit logic, said predecode bit logic comprising said circuitry for generating said prefetch data value.

23. The apparatus of claim 22, wherein said prefetch data value is associated with a current instruction and is sent to said instruction storage device with said current instruction.

24. The apparatus of claim 23, wherein said predecode bit logic generates said prefetch data value in response to a set of predecode bits.

25. The apparatus of claim 24, wherein said set of predecode bits includes a predecode bit associated with said current instruction and a predecode bit associated with each subsequent instruction in a current predetermined instruction set.

26. The apparatus of claim 24, wherein said set of predecode bits includes a predecode bit associated with said current instruction and a predecode bit associated with a preselected set of subsequent instructions in a current preselected instruction set.

27. A data processing system for reducing cache miss penalties comprising:

at least one memory device;

an instruction storage device for receiving a plurality of instructions from said at least one memory device;

a predecode device for predecoding a portion of each of said plurality of instructions, said predecode device outputting a predecode bit associated with each instruction to said instruction storage device; and a fetch logic device for retrieving instructions from said instruction storage device wherein said fetch logic device prefetches a next sequential instruction set for loading into said instruction storage device in response to said predecode bits.

28. The data processing system of claim 27 further comprising circuitry for generating a prefetch data value from one or more of said predecode bits, said fetch logic prefetching said next sequential instruction set when said prefetch data value is a predetermined value.

29. The data processing system of claim 28, wherein said fetch logic device includes said circuitry for generating said prefetch data value.

30. The data processing system of claim 28, wherein said predecode device includes said circuitry for generating said prefetch data value.

31. The data processing system of claim 29 wherein said instruction storage device is an instruction cache.

32. The data processing system of claim 30, wherein said instruction storage device is an instruction cache.

33. The data processing system of claim 27, wherein said at least one memory device is external to said processor.

* * * * *

UNITED STATES PATENT AND TRADEMARK OFFICE
CERTIFICATE OF CORRECTION

PATENT NO. : 6,658,534 B1
DATED : December 2, 2003
INVENTOR(S) : Steven Wayne White et al.

It is certified that error appears in the above-identified patent and that said Letters Patent is hereby corrected as shown below:

Column 9,
Line 47, please replace "instructions" with -- instruction --.
Line 55, please replace "an" with -- said --.
Line 67, following "said" please insert -- set of --.

Column 10,
Line 9, please replace "instructions" with -- instruction --.
Line 17, please replace "an" with -- said --.
Line 29, following "said" please insert -- set of --.

Signed and Sealed this

Twenty-eighth Day of December, 2004

JON W. DUDAS
*Director of the United States Patent and Trademark Office*